Sept. 8, 1936.  W. L. BENNINGHOFF  2,054,028
MACHINE FOR CUTTING THREADS
Filed Sept. 13, 1934  6 Sheets-Sheet 1

INVENTOR:
William L. Benninghoff
BY Ray S. Gehr
ATTORNEY

Sept. 8, 1936.  W. L. BENNINGHOFF  2,054,028
MACHINE FOR CUTTING THREADS
Filed Sept. 13, 1934  6 Sheets-Sheet 4

INVENTOR:
William L. Benninghoff
By Ray S. Uhr
ATTORNEY

Patented Sept. 8, 1936

2,054,028

UNITED STATES PATENT OFFICE 2,054,028

MACHINE FOR CUTTING THREADS

William L. Benninghoff, Shaker Heights, Ohio

Application September 13, 1934, Serial No. 743,801

26 Claims. (Cl. 10—120.5)

The invention relates to thread-forming tools and more particularly to tools for forming taper threads. While, in its broader aspects, the invention is applicable to the formation of either internal or external threads, certain of its features relate more especially to the cutting of external threads and, therefore, it is convenient to explain and illustrate the invention as embodied in a die for cutting external taper threads.

The objects of the invention, generally stated, include: the production of a tool which, both initially and after prolonged use, is adapted to form taper threads with a high degree of accuracy; the production of a tool for forming taper threads which is readily adjustable or adaptable to form threads of different pitches and tapers and to accommodate work of different sizes; the production of a tool for cutting taper threads which operates smoothly, without shock and with reliable uniformity; the provision in a tool of the character stated of manual control and setting devices which permit the convenient and rapid normal operation of the tool and the convenient and rapid adjustment and setting up of the tool in preparation for its normal operation; and the provision of a tool of the character stated having improved means for supplying lubricating or cooling fluid to the cutters.

Various additional objects, more or less incidental or ancillary to the more general objects above noted, will appear in the detailed description which follows.

With the stated objects in view, the invention consists in various features of construction and combinations of parts as hereinafter described in detail in connection with the accompanying drawings and defined by the appended claims.

In the drawings,

Fig. 13 is a front elevation of the tool with the parts broken away and shown in section at one point to illustrate certain features of the construction.

Fig. 14 is a vertical transverse section on the line 14—14 of Figs. 2 and 10.

Fig. 15 is a rear elevation of the tool proper with a portion of the structure broken away to better illustrate the construction, this view being taken from the plane indicated by line 15—15 in Figs. 2 and 10.

The three views of Fig. 16 illustrate a cam bar of the tool in plan, side and bottom views, respectively.

Fig. 17 shows two detached views of one of the latch members of the tool.

Fig. 18 shows the latch-actuating cam in plan, side and bottom views, respectively.

Fig. 19 shows side and end views, respectively, of one of the cam members of the tool.

Figures 1, 3, 4, 5:
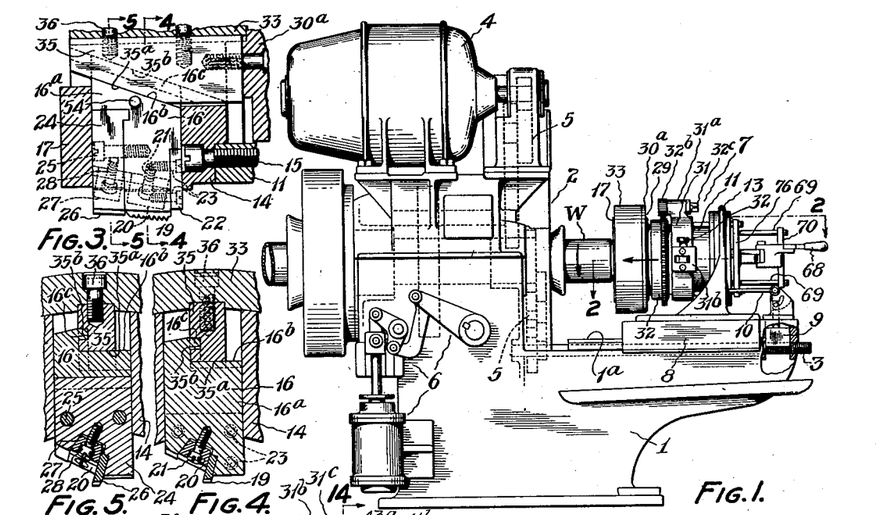
Fig. 1 is a side elevation of a machine embodying my improved tool and illustrating one way of mounting and operating the tool and illustrating the way in which the tool can be mounted and operated when the pipe or work to be threaded is rotated.
Fig. 3 is a fragmentary portion of Fig. 2 on an enlarged scale to more clearly show some of the features of construction.
Fig. 4 is a section on the line 4—4 of Fig. 3.
Fig. 5 is a section on the line 5—5 of Fig. 3.

Referring first to the form of the tool shown in Figs. 1 to 19, inclusive, 1 designates the main frame of a machine of the lathe type, 2 designates as an entirety the head stock of the machine which comprises a tubular clutch to grip the pipe to be threaded and 3 is a lead screw. 4 is an electric motor which through suitable trains of gears designated in their entirety by 5, serves to drive the clutch to rotate the work and to rotate the lead screw 3. 6 designates in its entirety compressed air mechanism for actuating the clutch that grips the work. The die or tool proper, in Fig. 1, is designated in its entirety by the numeral 7. The tool comprises a base 8 which is slidably mounted upon suitable ways 1a of the machine frame. The base 8 carries a lead nut 9 which can be moved by a manual lever 10 into and out of operative engagement with the lead screw 3. With a machine of this type the pipe to be threaded is rotated but held against axial movement while the thread-cutting tool is held against rotation and fed axially in relation to the pipe.

Referring now to the construction of the tool or die to which my improvements more particularly relate, the tool comprises a tubular, horizontally-disposed body 11 which has its rear flanged end 11a secured by bolts 12 to an annular upstanding bracket 13 carried by the base 8. An annular head 14 is detachably secured by screw bolts 15 to the front end of the body 11. The head 14 constitutes in effect a detachable part of the body structure. The head 14 is formed with a series of radial slots in which are slidably mounted a corresponding number of cutter carriers, each designated as an entirety by 16 (see Figs. 2, 3, 4, 5 and 13). The sides of the said slots engage and guide the carriers 16 on three sides and on their front sides the carriers are engaged and guided by a ring 17 which is secured to the head 14 by machine screws 18.

Each of the carriers 16 comprises a main body 16a which is slotted at its inner end to receive a thread-forming chaser 19 which is rigidly secured to the body 16a by a tapered block 20 and machine screw 21 (Fig. 4). The chaser is additionally secured by a plate 22 which is secured to the body 16a by screws 23 (Figs. 3, 4 and 5). A block 24 is detachably secured by screws 25 to the front side of the body 16a and the inner end of the block 24 is slotted to receive a plain cutter 26 which is secured by a taper block 27 and screw 28. The cutter 26 is additionally secured at its rear edge by the body 16a of the cutter carrier and at its front edge by the ring 17.

The construction last described provides a rigid unitary cutter carrier slidably mounted for radial movement in the head of the tool. By mounting on this unitary carrier both the thread-forming chaser 19 and the plain cutter 26, which is adapted to cut a taper surface in advance of the chaser, the latter is required to remove a minimum of metal and a clean and accurate formation of the thread is facilitated.

In the operation of the tool the cutter carriers are gradually retracted outward away from the work to cut the thread in taper form, and at the end of the cutting operation proper the cutters are further rapidly retracted from engagement with the work. I shall now describe the novel mechanism which I have devised to effect these gradual and rapid movements of the cutters.

Figure 2:
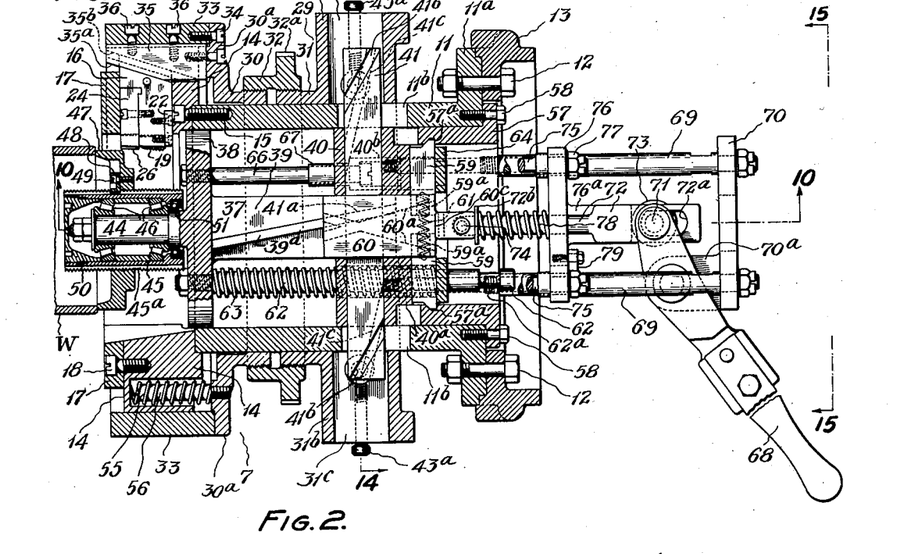
Fig. 2 is an enlarged section on the lines 2—2 of Fig. 1 and Figs. 10, 13 and 14, showing the parts of the tool in the relative positions occupied when the thread-cutting operation is started.

On the cylindrical outer surface of the tubular body 11 is mounted a slide structure designated as an entirety by the numeral 29. This slide 29 comprises a front section 30, a rear section 31 and a ring 32 for adjustably connecting the sections 30 and 31. The two sections and the ring are screw threaded as shown in Fig. 2, the threads on one section being right hand and those on the other section left hand so that the two sections can be adjusted in relation to each other in an axial direction by turning the ring 32 in relation to the sections. For conveniently effecting this adjustment the ring 32 is formed with a toothed flange 32a and an actuating pinion 32b has its spindle 32c mounted in a lug 31a formed on the top of the slide section 31 (see Figs. 1, 10, and 14). By applying a wrench to the spindle 32c the pinion can be turned to adjust the ring 32 and the friction between the threaded parts and the ring-actuating devices effectively holds the ring in adjusted position. The slide structure further comprises a ring 33 which is secured by a series of machine screws 34 to the outwardly flanged front end 30a of the slide section 30. On its inner surface the ring 33 is formed with a circumferential series of shallow slots in which a corresponding series of cam blocks 35 are secured by screws 36, one such block being disposed in alignment with each of the cutter carriers 16 previously described. Each block 35 is formed on its inner side with a forwardly and outwardly flaring cam surface 35a and on one side with a cam groove 35b which extends parallel to the cam surface 35a. The body member 16a of each cutter carrier is formed with a cam surface 16b to fit the cam surface 35a of its cam block 35 and with a tongue 16c to fit the groove 35b of the said cam block. With the cam connections thus formed between the slide 29 and the series of slidably mounted cutter carriers, the latter can be moved inward and outward by movement of the slide 29 on the tool body 11.

To effect suitable relative movement of the slide 29 and the tool body 11 the following means are provided. Within the tubular tool body 11 is mounted a slide structure designated in its entirety by 37. This inner slide comprises a piston-like cylindrical part 38 which slidably engages the inner surface of the body 11. With the part 38 is integrally formed a rearwardly extending cam bar 39 which is rectangular in cross section and is formed on its upper surface with a diagonally extending cam tongue 39a.

There is also slidably mounted within the tubular body 11 a cylindrical block 40 which constitutes a working abutment or carrier for a transversely disposed cam bar 41 which is rectangular in cross section and which slidably fits a correspondingly shaped passage extending transversely through the carrier block 40. The respective ends of the cam bar 41 project from the carrier 40 through slots 11b, 11b in the tool body 11. The top and bottom sides of the slots 11b slidably fit the top and bottom sides of bar 41 and said slots are long enough to permit lateral movement of bar 41 parallel to the axis of the tool. On its under side the cam bar 41 is formed with a slot 41a to fit and slidably engage the tongue 39a of the slide bar 39. During the thread-forming operation of the tool the cam carrier 40 is held against movement in the tool body 11 by means which will presently be described. Consequently when the inner slide 37 is moved in an axial direction in the tool body 11 the cam connection between the slide and the cam bar 41 effects endwise movement of said bar in one direction or the other according to the direction in which the inner slide moves in relation to the tool body.

Near its two ends the cam bar 41 is formed, on one side, with cam slots 41b, 41b and, on its other side, with cam slots 41c, 41c, the inclination of the latter slots to the longitudinal axis of the bar being less than the inclination of the slots 41b. As is clearly shown in Figs. 2 and 14, the rear section 31 of the outer slide 29 is provided with heavy, laterally extending bosses 31b, 31b which are formed with passages 31c, 31c, the upper and lower walls of which slidably engage the upper and lower sides of the cam bar 41 while the horizontal transverse dimensions of said passages are considerably greater than the width of the cam bar 41. In each of the bosses 31b is detachably mounted a cylindrical cam member 42 which has its inner end formed with a cam tongue 42a which slidably engages one of the cam grooves 41b of the bar 41. The cylindrical cam members 42 are detachably secured in position by screws 43 which engage grooves 42b formed in the members 42. In this manner a cam connection is effected between the cam bar 41 and the slide 29 so that longitudinal movement of the bar 41 effected, as previously described by movement of the slide 37 in the tool body 11, causes movement of the slide 29 lengthwise of the said tool body. Rotation of the slide member 31 on the body 11 is prevented by bar 41.

The bosses 31b are formed with a lower set of alternately useable apertures to receive the cylindrical cam members 42 and with a duplicate double set of securing screws 43a, 43a and by transferring the cam members 42 to the lower apertures the cam tongues 42a are caused to engage the bottom cam grooves 41c of the cam bar 41 and with this arrangement a given longitudinal movement of the cam bar 41 causes a smaller movement of the outer slide 29 than is effected by the same movement of the bar 41 when the cam grooves 41b are in use.

The cylindrical construction of the cam members 42 and the manner of securing them in operative position permits them to turn freely in the bosses 31b so that their cam tongues 42a are adapted to fit cam grooves of the bar 41 of any angularity and binding between the two cam members is avoided.

The cylindrical part 38 of the slide 37 is formed on its front side with an axially disposed spindle 44 upon which is rotatably mounted a hub 45, anti-friction bearings 46 of the roller type being interposed between the spindle and the hub to minimize friction. The outer cylindrical surface of the hub 45 is threaded and a work-engaging wheel 47 with a central aperture threaded to fit the hub is adjustably mounted thereon. The wheel 47 carries a latch or detent member 48 which is removably secured by a screw 49 and which is formed to engage any one of a series of longitudinal slots 45a in the hub 45 so that the wheel 47 can be locked in any adjusted position lengthwise of the hub. The front end of the hub is closed by a plug 50 which is threaded into the end of the hub and is prevented from loosening by a screw-actuated locking device as shown at 50a in Fig. 10. The joint between the rear end of the hub and the spindle is closed by a packing 51 and the space within the hub can thus be packed with lubricant to insure suitable lubrication of the anti-friction bearings over prolonged periods.

The pipe or other work to be threaded is indicated by the letter W in the various figures of the drawings and it will be seen that when the work is engaged by the wheel 47 of the inner slide 37 and the tool body 11 is fed forward in relation to the work, rearward movement of the slide 37 in the tool body 11 occurs with a resultant lengthwise movement of the cam bar 41 in a direction to effect a rearward movement of the outer slide 29 on the tool body 11, which latter movement in turn effects an outward retraction of the cutters. By designing the cam connections between the slide 37 and the cam bar 41 and between the said bar and the outer slide 29 and between the latter slide and the cutter carriers any desired rate of retraction of the cutters can be provided corresponding to the taper of the threads to be formed.

Figures 13, 14, 15, 16, 17, 18, 19:
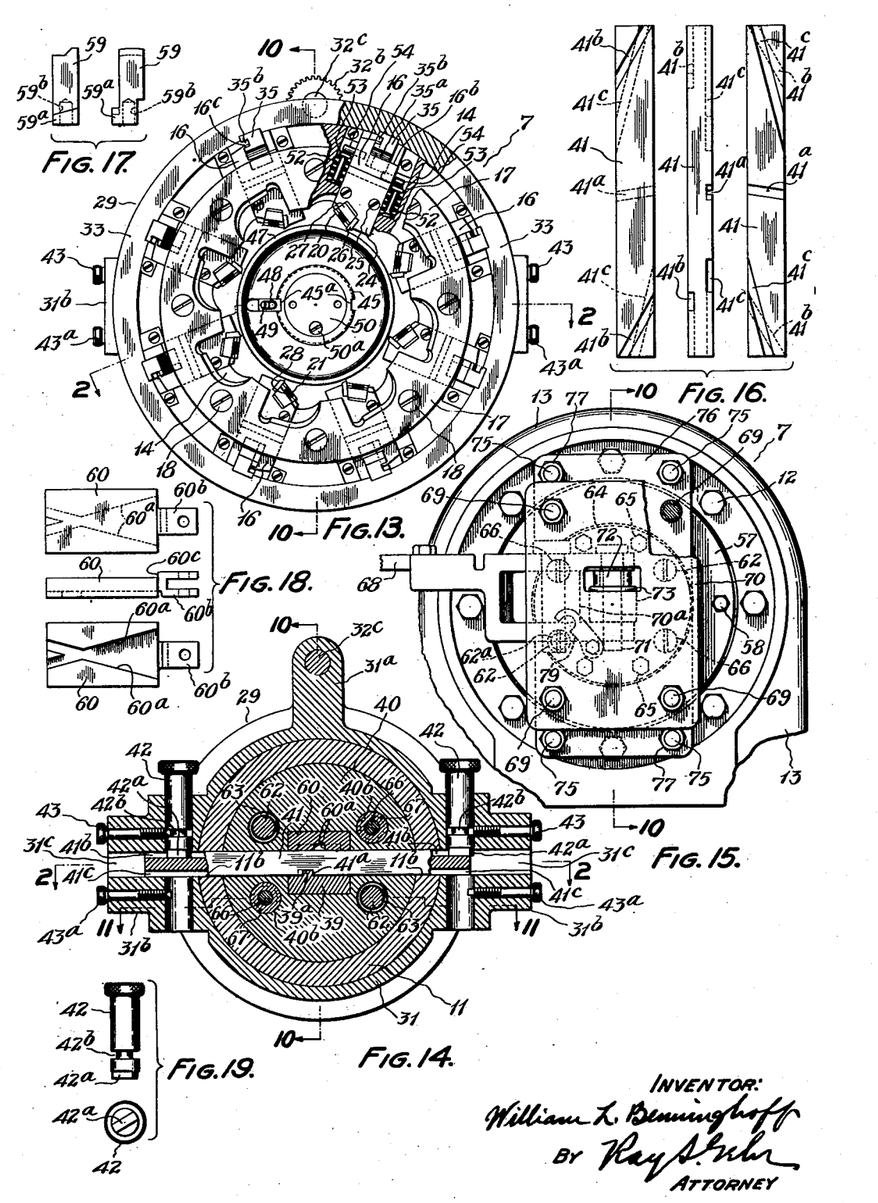

I have provided means for maintaining the coacting cam surfaces of the series of cam connections between the inner, work-engaging slide 37 and the cutter carriers 16 in constant close contact so as to avoid the entrance of dirt between the coacting surfaces and to minimize any tendency of the cam connections to chatter, both results obviously favoring accurate and uniform operation and minimum wear of the parts. Thus, in the case of the cam connections between the cutter carriers and the outer slide structure 29 I provide springs 52, 52 disposed at either side of the main body 16a of the cutter carrier and which press the heads of pins 53 radially outward against pins 54 carried by the body 16a (Fig. 13). In the case of the other cam connections referred to, the outer slide structure is yieldingly urged rearward on the tool body 11 by a circumferential series of coil springs 55 which are disposed in sockets formed in the annular head 14 and which are supported upon pins 56 carried by the slide member 30 (Figs. 2, 6, 7 and 10). The pressure of these springs 55 yieldingly but effectively maintains in close engagement the coacting cam surfaces of the cam connections between the outer slide 29 and the cam bar 41 and of the cam connection between said bar 41 and the inner slide member 39.

As previously noted, the cam abutment or carrier 40 is designed to be held in fixed position while the cutters are engaging the work. The carrier 40, however, is also designed to have a sudden, rapid movement at the end of the thread-cutting operation and, by the resulting lateral movement of the cam bar 41 parallel to the axis of the tool, to effect a rapid rearward movement of the outer slide 29 and a correspondingly rapid retraction of the cutters from engagement with the work. I shall now refer to the means provided for controlling and moving the carrier 40 in the manner referred to.

The cylindrical carrier 40 is formed with a cylindrical rearward extension 40a of smaller diameter which has a nice sliding fit within a flanged sleeve 57 which is secured by bolts 58 in the rear end of the body 11. In the extension 40a are slidably mounted two diametrically opposite radially extending latches 59, 59, the outer ends of which are designed to engage notches 57a in the sleeve 57. The rear sides of both the latches 59 and the notches 57a are formed at right angles to the axis of the tool while their front sides are inclined, as clearly shown in Fig. 2. The inner ends of the latches 59 are formed with cam lugs 59a (Fig. 17) which cooperate with a cam block 60 which is mounted to slide in an axial direction in the carrier 40 and which is formed on its under side with cam surfaces 60a designed to engage the lugs 59a of the latches 59 (Figs. 2, 10, 14 and 18). The front end of the cam block 60 normally projects from the front side of the carrier 40, as shown in Fig. 2, and in this position the cam connections between the block 60 and the latches 59 permit the latter to be forced outward into engagement with the notches 57a by a coil spring 61 which is interposed between the inner ends of the latches 59 and fits within sockets 59b formed in the inner ends of the latches (Fig. 17).

Figure 11:
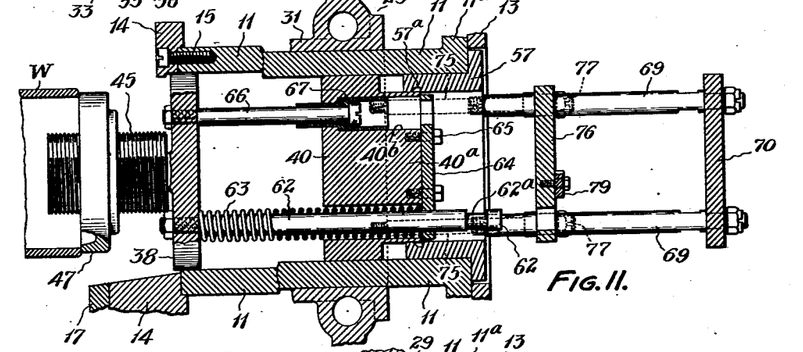
Fig. 11 is a horizontal section taken on the broken lines 11—11 of Figs. 10 and 14.
Figure 12:
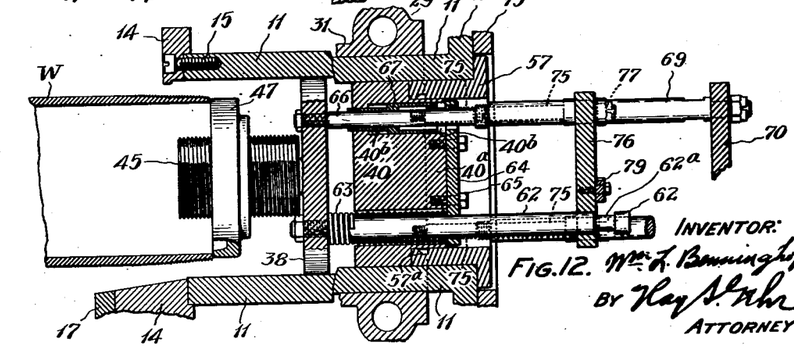
Fig. 12 is a view similar to Fig. 11 but showing the parts of the tool in the same positions as are shown in Fig. 7.

The cylindrical part 38 of the inner slide structure carries two rearwardly extending rods 62, 62 which are disposed diametrically opposite each other (Fig. 14). These rods extend through apertures in the carrier 40 and each rod is surrounded by a long coil spring 63 which also extends through the aperture in the carrier 40 and which abuts at its front end against the slide part 38 and at its rear end against a plate 64 which is secured by bolts 65 to the rear face of the extension 40a (Figs. 2, 11 and 12). As the inner slide 37 moves rearward in the tool body the springs 63 are compressed and exert a rearward pressure upon the carrier 40, which pressure during the thread-forming operation is resisted by the latches 59.

The cylindrical slide member 38 also carries two diametrically opposite rearwardly extending rods or bolts 66, 66 which fit within sleeve-like pistons 67, 67 which are slidably mounted in passages 40b in the carrier 40, 40a (Figs. 2, 11 and 12). The piston 67 performs a dash pot function which will later be explained.

From the foregoing description it will be seen that the inner slide structure 37, the outer slide structure 29 and the parts operatively connecting the two slides constitute a train of parts between the work and the chasers which have mutually engaging cam surfaces that are at all times in mutual engagement throughout substantial areas and by their relative movement effect the inward and outward movement of the chasers.

Figure 10:
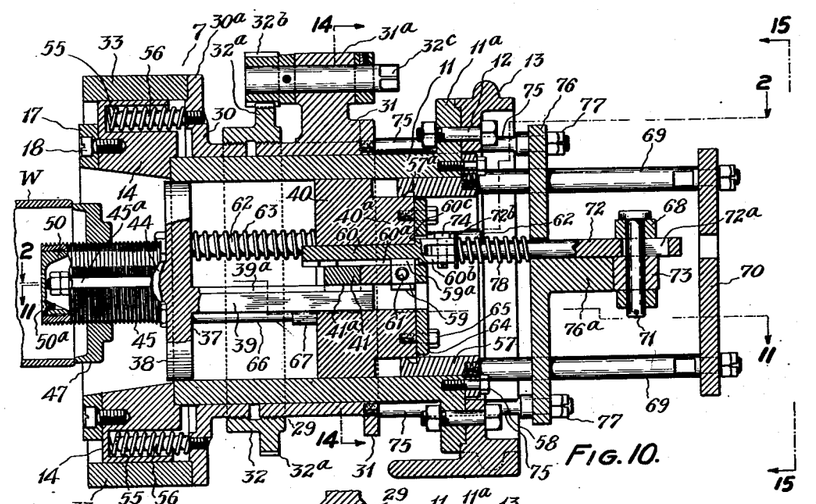
Fig. 10 is a vertical axial section taken on the line 10—10 of Figs. 2, 13, 14 and 15.

To afford the necessary or desirable manual control of the tool, I provide a manual lever 68 adapted to actuate certain parts of the mechanism. As shown in Fig. 10, the sleeve 57 of the tool body carries four rearwardly extending rods 69, 69 which, at their rear ends, rigidly support a plate 70 having a forwardly extending lug 70a upon which the lever 68 is pivotally mounted (Figs. 1, 2, 6, 10 and 15).

The hand lever 68 is forked (Fig. 15) to embrace the pivot lug 70a and the forked end of the lever carries a pin 71 which passes through a link 72 and carries, below said link, a roller 73. The link 72 is formed with an elongated slot 72a through which the pin 71 passes, thus providing a lost motion connection between the lever and the rear end of the link 72. The front end of the link 72 is pivotally connected by a pin 74 with a forked lug 60b on the rear end of the cam block 60. The top surface of the lug 60b is disposed above the top surface of the body of the block 60 so as to provide a shoulder 60c adapted to engage the rear face of the cam carrier 40 (Figs. 10 and 18). The outer slide structure 29 carries a rearwardly extending frame structure consisting of four rods 75, 75 which are screwed into the slide section 31 and a plate 76 which is secured on the rear ends of the rods 75 by nuts 77. The plate 76 is formed with a rearwardly extending lug 76a which is arranged to be engaged by the roller 73 carried by the hand lever 68. A coil spring 78 is mounted on the link 72 with its front end abutting against a washer 72b and at its rear end abutting against the upright plate 76. The spring 78 presses the cam block 60 forward and tends to hold its shoulder 60c in engagement with the rear face of the carrier 40. With the pivotal support of the hand lever 68 fixed on the tool body, rearward movement of the lever handle serves to move forward both the link 72 and the plate 76. Such movement of the link causes the forward movement of the cam block 60 and the cam carrier 40 while the forward movement of the plate 76 causes a corresponding movement of the outer slide 29.

In the operation of my improved threading tool, it is first set or adjusted in accordance with the diameter of the pipe or other work to be threaded and in accordance with the taper and length of the threads to be formed. With the inner slide 37 moved forward and the cam carrier 40 latched in its forward position, as shown in Fig. 2, the first of the three adjustments referred to is effected by turning the ring 32 to adjust the front section 30 of the tool slide forward or backward, as the case may be, so that the cutters when in their innermost position will be suitably disposed to start the cut. The adjustment of the tool for the taper of the threads is effected by placing the cylindrical cam members 42 in engagement with the top cam groove 41b or the bottom cam groove 41c of the cam bar 41; or, if a still different taper is desired, a different cam bar 41 having cam grooves of still different inclination may be substituted in the tool, as will readily be understood. Finally, adjustment for the length of the thread to be formed is effected by adjustment of the work-engaging wheel 47 lengthwise of its rotatable hub 45.

Figures 6, 8, 9:
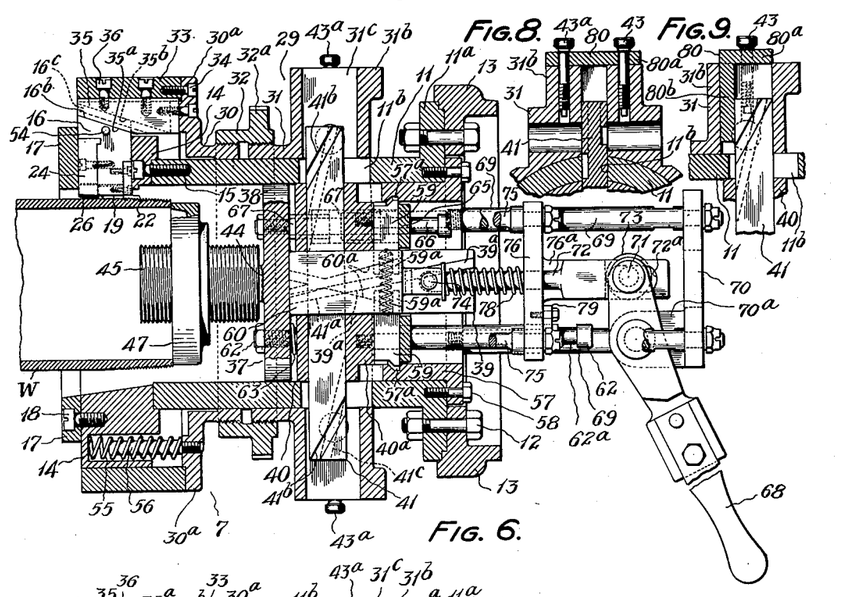
Fig. 6 is a view similar to Fig. 2 but showing the parts of the tool in the relative positions occupied as the cutting of the taper thread is nearing completion and just prior to the rapid retraction of the cutters.
Figs. 8 and 9 are fragmentary sectional views illustrating the use of an alternative member to adapt the tool for the cutting of straight threads instead of taper threads.
Figure 7:
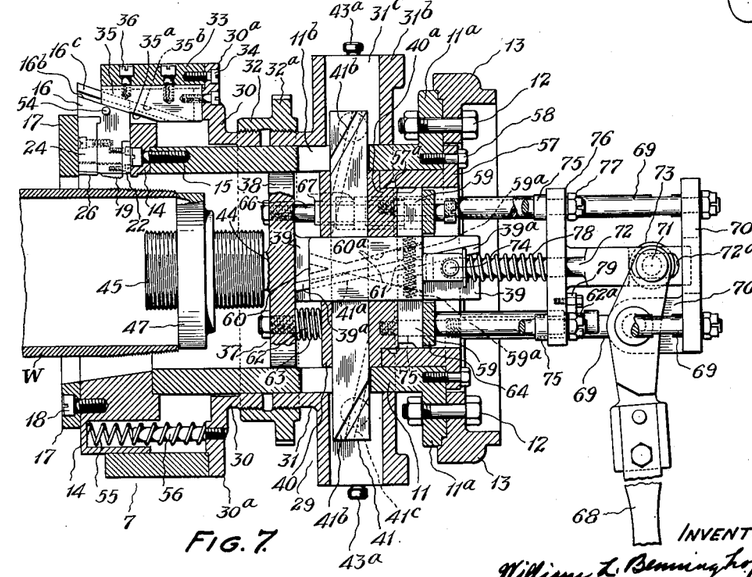
Fig. 7 is a view similar to Figs. 2 and 6 but showing the parts of the tool in the relative positions occupied after the rapid retraction of the cutters.

The tool having been adjusted and the pipe or other work to be threaded having been inserted and gripped in the rotary work holder, the die 7 is moved forward on the bed of the machine until the end of the work engages the wheel 47 of the inner slide structure 37, as shown in Figs. 1 and 2. With the feed nut 9 in engagement with the lead screw 3, the rotation of the drive motor 4 now simultaneously rotates the work and advances the tool 7 to start the threading cut, the amount of the advance movement to bring the cutters into engagement with the work depending upon the adjustment of the work-engaging wheel 47 upon its hub, which in turn depends upon the length of thread to be formed. The plain cutters 26 first engage the work and prepare it for the operation of the toothed chasers 19. As the tool body 11 is fed forward in relation to the work the inner slide structure 37, by reason of its engagement with the work, has a relative movement rearward in relation to the body 11. This effects a lateral movement in one direction of the cam bar 41 which in turn moves the outer slide 29 rearward in relation to the tool body 11. This last movement in turn gradually and slowly retracts the cutters radially outward so that they effect a taper cut. As the cut proceeds the cylindrical part 38 of the inner slide approaches the cam carrier 40 until the rear face of said part 38 engages the front end of the cam block 60. Thereupon continued movement of the parts effects a rearward movement of the cam block 60 and this causes an inward movement of the latches 59. In Fig. 6 the various parts are shown in the positions occupied when the latches 59 have just reached the point of disengagement from the sleeve 57 of the tool body. With a slight further movement of the parts the latches are disengaged and thereupon the springs 63, which have been greatly compressed during the rearward movement of the slide 37, suddenly cause a rapid rearward movement of the cam carrier 40. This rearward movement of the cam carrier relative to the inner slide 37 causes an endwise movement of the cam bar 41 in a direction opposite to that which occurs during the gradual thread-cutting movement and this tends to move the cutter carriers inward. This tendency, however, is more than offset by the lateral rearward movement of the cam bar 41 with its carrier 40 so that the net effect of the sudden movement of the cam bar carrier is to rapidly move the outer slide 29 rearward on the tool body 11 so as to effect a correspondingly rapid retraction of the cutters away from the work. The positions of the various parts of the tool at the end of this rapid retraction of the cutters are shown in Fig. 7.

To avoid shock incident to the sudden release and rapid rearward movement of the cam carrier 40, I have designed the tool body 11, its sleeve 57 and the cam carrier 40 to cooperate in a manner to afford a dash pot action to cushion the sudden rearward movement of the cam carrier 40 and associated parts. On reference to Figs. 2, 6 and 7 it will be observed that the rearward extension 40a of the carrier 40 has a close sliding fit in the sleeve 57 so that when the rear edge of the main body of the cam carrier 40 passes over the rear end of the slots 11b in the tool body, an annular body of air is trapped between the tool body structure and the carrier 40 and the slow escape of the air provides the cushioning effect referred to.

The cutting of the thread having been completed the feed nut 9 is disengaged and the die moved rearward on the ways 1a. As the die and the work move apart the coil springs 63 effect the forward movement of the inner slide 37 in the tool body 11. The movement of the slide 37 away from the cam carrier 40 is limited and cushioned by the bolts 66 and sleeve-like pistons 67. The pistons 67 having been moved rearward in the cam carrier 40 by the cylindrical slide part 38 at the end of the thread-cutting operation (Fig. 6), near the end of the forward return movement of the inner slide the heads of the bolts 66 engage the pistons 67 and the slow escape of the annular body of air between the pistons 67 and the bores 40b in cam carrier 40 cushions the remainder of the movement and obviates shock.

The cutters and other parts of the tool may now be restored to their proper positions for starting another thread-cutting operation by manipulation of the hand lever 68. The rearward movement of the outer slide structure 29 during the thread-cutting operation, by reason of the engagement of the lug 76a with the roller 73 of lever 68 causes said lever to swing from the position shown in Fig. 2 first to the position shown in Fig. 6 and finally to that shown in Fig. 7. By moving the handle of lever 68 rearward from the position shown in Fig. 7 the outer slide 29 is moved forward on the tool body 11 by reason of the engagement of the roller 73 of the lever 68 with the lug 76a of plate 76 (Fig. 10) which is carried by the said slide. The forward movement of the outer slide 29 on the tool body effects the inward movement of the cutter carriers and cutters thereon from the position shown in Fig. 7 to that shown in Fig. 2. This same rearward movement of the handle of lever 68, by reason of the engagement of the lever pin 71 with the forward end of the slot 72a of the link 72, causes the latter to move the carrier 40 forward to the position shown in Fig. 2 so that the latches 59 can again engage the notches in the sleeve 57 of the tool body.

The tool is now re-set and upon substituting another section of pipe for that already threaded the machine is started and the operation repeated as above described.

In the interest of a clear understanding of the operation of the tool it is noted that the springs 55 and the springs 63 not only have their respective peculiar functions but are also more or less complementary in operation. The springs 55 tend to hold all cam surfaces of the transverse bar 41 in firm operative contact with the other cam surfaces cooperating therewith. Said springs 15 also tend to hold the latches 59 in firm engagement with the shoulders of their keeper notches or grooves 57a and thus serve to definitely locate the system consisting of the abutment 40 and the inner slide structure at the time the rods 66 are fully extended and placed under tension by the springs 63. Springs 55 further tend to assist the rapid retraction of the cutters by assisting in the rearward movement of the abutment 40. The springs 63 serve to hold the inner slide against the work and to return the inner slide to its initial position at the time the tool is set for the thread-cutting operation. Springs 63 also tend to hold the latches against their keeper shoulders so long as the rods 66 are not fully extended and under tension. During the thread-cutting operation while springs 55 expand and have their tension diminish, the springs 63 are meanwhile compressed and have their tension increased, so that the two sets of springs complement each other and serve to maintain a more uniform spring action. The two sets of springs 55 and 63 further cooperate in the setting of the tool. In this operation the outer slide is pressed forward by the hand lever 68. Thus the lever 68 takes the pressure of springs 55 and relieves the cam surfaces between the outer slide and the bar 41 from pressure and friction which would otherwise be caused by the pressure of the springs 55. This makes it easy for the springs 63 to push the inner slide forward and move the cam bar 41 upward, thus insuring an easier and smoother action of the tool.

Another feature of the tool which contributes materially to smoothness of operation is the rotary structure comprising the hub 45 and the wheel 47 which is mounted by means of anti-friction bearings on the front of the inner slide 37 of the tool. In prior constructions in which the cutter-controlling part of the apparatus which engages the work had relative rotation with respect to the work, the irregular and relatively rough surface of the work set up friction between the relatively turning work and the tool part engaging it so that the relative rotation of said parts tended to induce vibration in the cutting mechanism with resultant tendency to roughness or unevenness of the thread formed. In my improved construction the relative rotation is transferred to the anti-friction mounting of the rotary structure 45, 47 and this insures extreme smoothness of operation in this respect and so substantially contributes to the high standard of work secured with my improved form of tool. In addition, the construction, by reason of the easily adjustable mounting of the wheel 47, adapts the tool to ready adjustment for variations in the length of the thread cut. However, it is observed in this connection that I make no claim herein to the features here referred to inasmuch as they are claimed in my divisional application Serial No. 94,066, filed August 3, 1936.

To facilitate inspection, adjustment or replacement of the cutters, I provide means for positively holding the parts of the tool in the relative positions shown in Fig. 7 with the cutters retracted to their outermost positions and the inner slide structure moved to its rearwost position, thus freely exposing the inner active parts of the cutters. On reference to Figs. 2, 12 and 15 it will be noted that one of the rods 62 is made longer than the other and formed with a reduced section or neck 62a near its rear end. When the parts of the tool are moved to the positions shown in Fig. 7 and Fig. 12 this elongated rod 62 projects through an aperture in the plate 76 so that a latch 79 pivoted on the plate 76 can be thrown into engagement with the rod 62 and prevent the coiled springs 63 from effecting a forward movement of the inner slide 37.

While the tool which has been described is especially designed for the cutting of taper threads, it can readily be adapted for the cutting of straight threads. This is accomplished by removing the cylindrical cam members 42 and introducing into each boss 31b of the outer slide member 31 an attachment 80, as shown in Figs. 8 and 9. The attachment 80 consists of a plate part 80a which engages the outer end or face of the boss 31b and an inward projection 80b which is adapted to extend between one side of the cam bar 41 and the adjacent inner wall of the boss 31b so as to prevent relative forward and rearward movement of the cam bar and the slide member 31. The plate-like part 80a of the attachment is provided with two apertures so that the attachment can be secured to the boss by the screws 43, 43a.

With this construction it will be seen that as the tool is fed forward relative to the work the inner slide structure 37 moves relatively rearward in the tool body 11 and the cam bar 41 moves endwise transversely to the tool body without effecting any forward or rearward movement of the outer slide 29. Consequently the cutters are not retracted but are held in fixed positions. Obviously cutters 19 and 26 suitable for cutting straight threads will be used for this purpose.

It will be observed that in my improved tool the latch members which are disengaged to permit rapid retraction of the chasers at the end of the threading operation are not integral parts of or rigid with any one of the train of parts constituting the operative connection between the chasers and the work-engaging member carried by the inner slide. Distinct advantages flow from this novel feature of the construction. One advantage is that the cooperating cam surfaces of the connections (a) between the chasers and the outer slide, (b) between the outer slide and the transverse bar, and (c) between the transverse bar and the inner slide which carries the work-engaging member, can at all times be firmly maintained in mutual contact over substantial areas by pressure of the springs 52 and 55 so that dirt cannot enter between said surfaces and so that the wear of said surfaces is minimized. Since the taper of the threads cut is determined by the cam surfaces referred to I avoid the inaccurate formation of the threads that would result from the entry of dirt or foreign substances between the cam surfaces and from very extensive wear of said surfaces or parts thereof such as prior forms of constructions known to me have been subject to. In such prior constructions the rapid collapse of the chasers is effected by disengagement from an abutment of some one of the members constituting the operative connection between the chasers and the work-engaging part. In such constructions the movement of the disengageable member over its abutment is necessarily coextensive with the gradual retraction of the chasers from the beginning to the end of the thread-cutting operation and since the overlapping areas of the disengageable member and its abutment in the latter part of this movement are small the resulting heavy wear between the surfaces unavoidably affects the taper of a considerable portion of the thread formed, rendering it inaccurate to a highly objectionable extent. With my improved type of construction, while the disengageable latch is moved as a result of the relative movement between the work-engaging slide and the tool body the designer is free to make the rate of movement of the latch independent of the rate of relative movement between the work-engaging slide and the tool body, as by control of the slope of the cams 60a, and is also able to limit the movement of the disengageable latch to a small part of the relative movement between the work-engaging slide and the tool body, as by the provision of large lost motion between the slide part 38 and the cam block 60. Thus with my improved construction the wear between the surfaces of the disengageable latch and its abutment affects the pitch of the thread only for a very small part thereof at the end of the thread-cutting operation and is unimportant. Consequently with my improved construction I am enabled to produce threads that are highly accurate and with minimum effects due to wear after prolonged use of the tool.

While I prefer in carrying out my invention to make use of cam devices to operatively connect the work-engaging slide and the cutter-engaging slide of the tool, I may interpose between the two slide structures various other forms of operative connecting devices including a movably mounted abutment and still realize some at least of the above noted advantages incident to the fact that the movement of the parts which effects the predetermined retraction of the cutters during the cutting operation is independent of the movement of the disengageable holding means for the movable abutment. This is true whether the movable holding means for the abutment takes the form of latches such as I employ in the construction illustrated or of other devices adapted when in one position to hold the abutment against movement and when moved to another position to release the abutment for rapid movement under the action of a spring or springs. With any reasonably simple and satisfactory form of latch or holding device, its movement to effect disengagement of the abutment is likely in one way or another to modify and render inaccurate the retraction of the cutters which determines the taper or, more generally speaking, the pitch diameter of the thread from point to point along the axis thereof.

Figure 20:
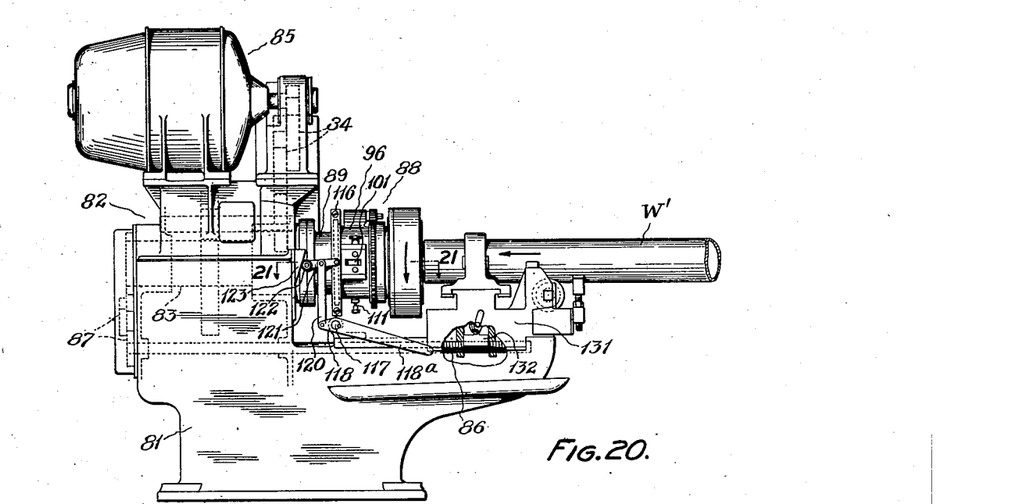
Fig. 20 is a side elevation of a modified form of machine showing one manner in which my improved tool can be constructed and mounted when the tool or die is to be rotated and the pipe or work fed axially without rotation.
Figure 21:
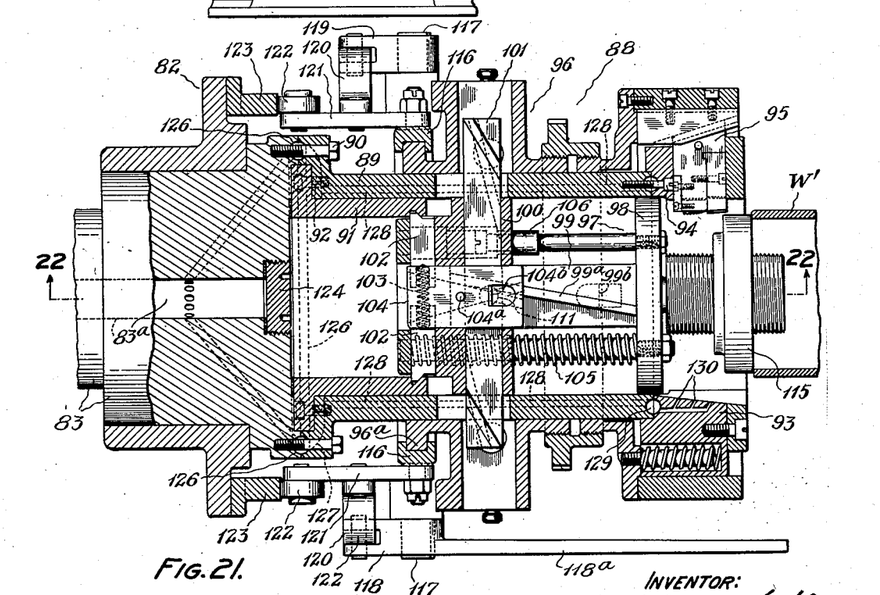
Fig. 21 is an enlarged horizontal section on the line 21—21 of Fig. 20, showing the construction of the tool proper.
Figures 22, 23, 24:
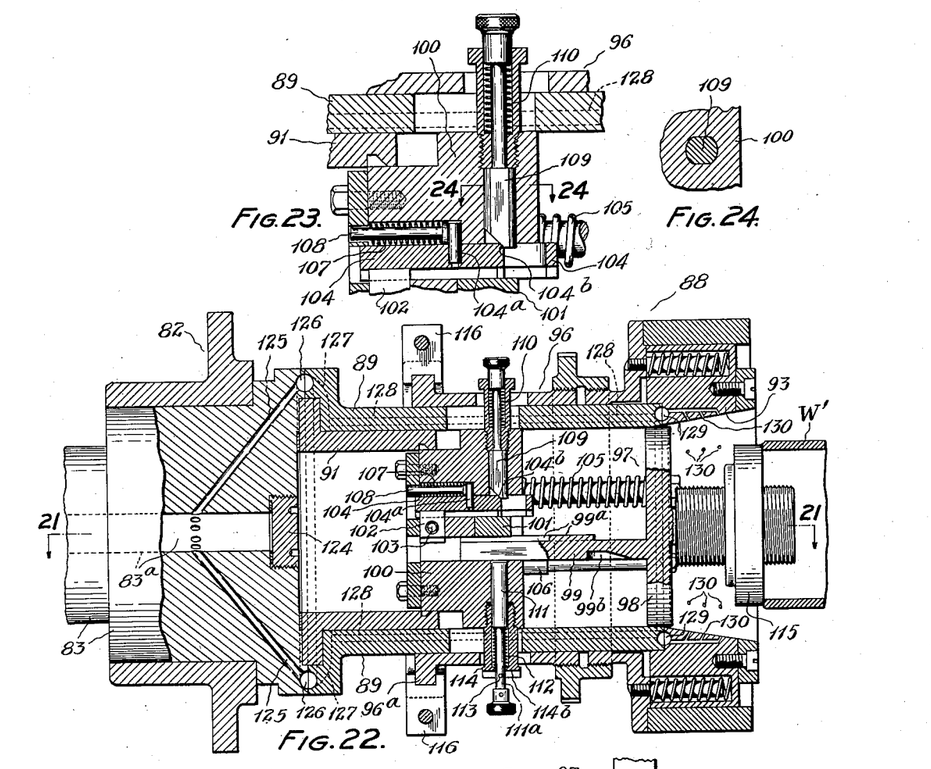
Fig. 22 is a vertical section on the line 22—22 of Fig. 21.
Fig. 23 is a fragmentary view showing a portion of the section of Fig. 22 on a larger scale.
Fig. 24 is a section on the line 24—24 of Fig. 23.
Figure 25:
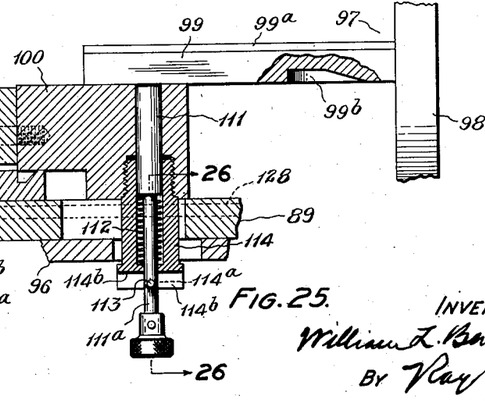
Fig. 25 is a fragmentary view showing another portion of the section of Fig. 22 on a larger scale.
Figure 26:
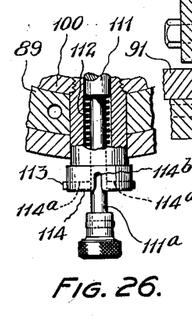
Fig. 26 is a section on the line 26—26 of Fig. 25.

In some cases it is desirable to form threads upon work that cannot readily or conveniently be rotated. In Figs. 20 to 26 I have illustrated an embodiment of my invention in a machine in which the die or tool proper is rotatably mounted on the power-driven head of the tool and the pipe or other work to be threaded is fed axially to the tool without rotation. As shown in Fig. 20, the machine comprises a main frame 81 and a head stock which is designated in its entirety by the numeral 82. In the head stock is rotatably mounted a shaft 83 adapted to be driven through a train of gears 84 by a motor 85. 86 is a lead screw driven through a train of gears 87 from the shaft 83. A die or tool proper, designated in its entirety by 88 and which is of the same general character as the tool 7 already described, is rigidly attached to the end of the head stock shaft 83 so as to rotate therewith. As shown in Fig. 21, the tool body 89 has its flanged end secured by screw bolts 90 to the end of shaft 83. A flanged sleeve 91 is secured by screws 92 in the rear end of body 89 and an annular cutter head 93 is secured by screws 94 to the front end of said body. The head 93 carries an annular series of radially slidable cutter carriers 95, the radial positions of which are controlled by an outer slide structure designated in its entirety by 96 which actuates the cutter carriers through cam connections like those of the first described tool. Indeed, the tool body, cutter head, cutter carriers and outer slide 96 are of the same character as the corresponding parts of the tool first described and will readily be understood from the drawings without further description. Within the tool body is an inner slide structure designated in its entirety by 97 and comprising a cylindrical part 98 and a bar-like rearward extension 99 formed on its top surface with a diagonally arranged cam 99a. As in the first described tool the rearward extension of the inner slide extends through a suitably shaped aperture in a cylindrical cam block 100 which carries a horizontally disposed cam bar 101 arranged to be moved endwise by axial movement of the extension 99 in relation to the carrier 100 and adapted by its endwise movement to effect a movement of the outer slide structure 96 lengthwise of the tool body by virtue of a cam connection between the bar 101 and the slide structure 96. The cam carrier 100 also carries latches 102 which are pressed radially outward by a coil spring 103. 104 is a cam block slidably mounted in the carrier 100 and adapted to retract the latches 102 when the block 104 is moved rearward in the carrier 100. A pair of coil springs 105 and a pair of dash pot devices, designated in their entirety by 106, are interposed between the cylindrical part 98 of the inner slide and the cam carrier 100. All of these parts within the tool body and the cam connection between the bar 101 and the slide structure 96 are similar to the corresponding parts of the first described construction except for certain details which will now be referred to.

The cam block 104 is fitted with an upstanding pin 104a which is pressed yieldingly forward by a coil spring 107 which is secured against buckling by a bolt 108. The spring 107 urges the cam block forward as far as its pin 104a will permit it to go. In the upper side of the cam carrier 100 is mounted a manually operable cam 109 which has its cam surface engaging the surface 104b of the cam block 104 and by depressing the cam 109 the block 104 can be moved rearward to disengage the latches 102. The cam 109 is normally retracted by a coil spring 110.

In the lower side of the cam carrier 100 is mounted a sliding bolt 111 which is adapted to engage a depression 99b in the under side of the slide extension 99. The bolt 111 has a handle extension 111a and is normally urged upward by a coil spring 112 but is held against upward movement by a transverse pin 113 which is carried by the bolt and rests in shallow notches 114a in a sleeve 114 which is screwed into cam carrier 100. By pulling the bolt 111 downward the cross pin 113 is disengaged from the shallow notches and then by turning the bolt 90 degrees pin 113 is permitted to drop into the deeper notches 114b, thus freeing the bolt for sufficient upward movement to engage the depression 99b. By means of the locking bolt 111 and the depression 99b the inner slide can be held in retracted position in relation to the tool body and the cam carrier 100.

The inner slide structure 97 carries an adjustable work-engaging wheel 115 of the same character as that of the tool first described.

To permit manual forward movement of the outer slide structure on the tool body to retract the cutters, the rear member of the outer slide structure 96 is provided with an outturned flange 96a which fits rotatably within the groove of an annular collar 116 which is held against turning by manually operable devices mounted on the bed of the machine frame. These devices comprise a transverse rocker shaft 117 horizontally mounted in the machine frame, levers 118 and 119 mounted on the respective ends of the shaft 117 and connected by links 120, 120 to arms 121, 121 which are pivoted to the collar 116 and which carry rollers 122, 122 adapted to engage cams 123, 123 secured to the frame of the machine. The lever 118 is provided with a handle extension 118a by which the arms 121 can be swung upward to effect forward movement of the outer slide structure 96 on the tool body. It will be understood that in the present construction, as in that first described, the outer slide structure 96 is held against rotation on the tool body by the cam bar 101.

In the rotating tool I provide special means for conducting lubricating or cooling liquid to the cutters. To this end the shaft 83 is provided with an axial bore 83a, the inner end of which is closed by a plug 124. The shaft 83 is also formed with a series of passages 125 which lead from the bore 83a to a circumferential passage 126 formed between the adjacent faces of the shaft 83 and the tool body 89. This annular passage 126 in turn communicates through radial passages 127 with longitudinal passages 128 in the tool body 89 and these latter passages in turn communicate with a circumferential passage 129 formed between the front end of the tool body 89 and the cutter head 93. Finally the cutter head is formed with a series of passages 130 which lead from the passage 129 and open through the inner side of the cutter head 93 at suitable points to supply liquid to the cutters. By supplying a lubricating or cooling liquid under suitable pressure to the bore 83a of shaft 83, such liquid can be conducted to the cutter head and discharged through the passages 130 upon the cutters and the work in a manner to effect the most efficient lubrication and cooling of the cutters.

As shown in Fig. 20, the work W′ is clamped in a work support designated in its entirety by 131 which is mounted to slide on suitable ways on the machine frame toward and from the rotating tool. To feed the work to the cutters, the work support 131 is fitted with a manually operable feed nut 132 which can be moved into and out of engagement with the lead screw 86. It will be understood that in carrying out my invention any suitable form of work support can be employed that is adapted to support the work and feed it toward and from the rotating die or tool proper.

Because of the similarity of the second form of tool to that first described the operation of the second tool will readily be understood without detail description. With the tool and work set as shown in Figs. 20 and 21, the machine drive is started and this causes the rotation of the tool proper and the feeding of the work to the cutters. As the work is fed to the cutters, the inner slide structure 97 is moved rearward with resultant lengthwise movement of the cutter bar 101 which in turn causes a rearward movement of the outer slide structure 96 and a gradual retraction of the cutter carriers and cutters to effect the cutting of taper threads. When this movement has continued a predetermined distance, which may be varied by adjusting the work-engaging wheel 115, the cylindrical part 98 of the inner slide structure engages the forward end of the cam block 104 and by moving the latter disengages the latches 102 and permits the springs 105 to move the cam carrier 100 rapidly rearward and thus effect a rapid retraction of the cutters away from the work, the rearward movement of the cam carrier 100 and associated parts being cushioned by trapping of air between the cam carrier 100 and the sleeve 91 of the tool body. During the engagement of the cutters with the work the lubricating or cooling liquid is constantly fed in the manner described to the cutters and work.

When the threaded work is removed or withdrawn from the tool the springs 105 force the inner slide structure forward again, this movement being cushioned as in the first form of machine, by the dash pot devices 106.

During the operation of the tool, if it should become desirable for any reason to retract the cutters this can be accomplished manually by depressing the cam 109 which moves the cam block 104 rearward and disengages the latches 102.

Again, when it is desired to provide free access to the cutters the latter can be held in retracted position by disengaging the locking bolt 111 so that it can engage the depression 99b of the inner slide. It will be observed that the depression 99b has its rear side vertical while its front side is inclined, thus preventing injury of the locking mechanism if the depression 99b should be moved rearward past the bolt 111 when the latter is released for locking action.

It will be appreciated that the second form of machine has many features of construction and operation in common with the machine first described and certain additional features which are not present in the first machine. In both forms of machine the objects enumerated at the outset are attained in an advantageous manner as will be understood by those familiar with thread forming machines.

The fundamental principles of my present invention are applicable to machines for cutting internal threads, and in my copending application Serial No. 15,558, filed April 10, 1935, I have shown and described such a machine.

In carrying out my invention its various features can be embodied in structures differing widely from the structures shown and described, as will be apparent from the appended claims which define the scope of the invention.

What I claim is:

1. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts which have coacting cam surfaces maintained in mutual engagement over substantial areas throughout the thread-cutting operation and adapted by their mutual relative movement to effect the said gradual retraction and insure a predetermined pitch diameter of the thread from point to point along its axis throughout at least the major portion of the thread cut and means comprising a movable latch and operable through at least a portion of said train of parts when said latch is moved to disengaged position to effect the rapid retraction of the cutter at the end of the thread-cutting operation, the mutual relative movement of the parts of said train throughout at least the major part of the thread-cutting operation being independent of the movement of the latch.

2. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts which have coacting cam surfaces maintained in mutual engagement over substantial areas throughout the thread-cutting operation and adapted by their mutual relative movement to effect the said gradual retraction and insure a predetermined pitch diameter of the thread from point to point along its axis throughout at least the major portion of the thread cut, an abutment for at least one of the cam parts movably mounted on the tool body and movably engaging said cam part, a spring tending to move the abutment in one direction on the tool body, a movable latch adapted when engaged to prevent such movement of the abutment, and means operable at the end of the thread-cutting movement of the tool to disengage the latch and, by the resulting rapid movement of the abutment, effect the aforesaid rapid retraction of the cutter, the mutual relative movement of the parts of said train throughout at least the major part of the thread-cutting operation being independent of the movement of the latch.

3. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts which have coacting cam surfaces maintained in mutual engagement over substantial areas throughout the thread-cutting operation and adapted by their mutual relative movement to effect the said gradual retraction and insure a predetermined pitch diameter of the thread from point to point along its axis throughout at least the major portion of the thread cut, an abutment for at least one of the cam parts movably mounted on the tool body and movably engaging said cam part, a spring tending to move the abutment in one direction on the tool body, a movable latch adapted to prevent such movement of the abutment but not its movement in the opposite direction, and means operable at the end of the thread-cutting movement of the tool to disengage the latch and, by the resulting rapid movement of the abutment, effect the aforesaid rapid retraction of the cutter, the mutual relative movement of the parts of said train throughout at least the major part of the thread-cutting operation being independent of the movement of the latch.

4. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the slide last referred to and the cutter to provide for movement of the cutter relative to the work when the said slide moves relative to the tool body; means for movably connecting the inner and outer slides comprising a structure having cam engagements with said slides; an abutment for said structure slidably mounted on the tool body and movably engaging said structure; a spring tending to move the abutment in one direction; and a latch for holding the abutment against such movement, said latch being disengageable by the relative movement of the tool body and the slide which is held against movement relative to the work and the movements of the slides relative to the tool body throughout at least the major part of the thread-cutting operation being independent of the movement of the latch.

5. In a tool for forming taper threads, the combination of a chambered tool body; means, comprising a cutter movably mounted on the body, for cutting a thread when the tool body and the work to be threaded are given relative rotational and axial movements; a slide mounted in the tool body adapted to be held against movement relative to the work during at least a portion of the thread-cutting operation; a slide mounted on the outer side of the tool body; a cam connection between the outer slide and the cutter to provide for movement of the cutter relative to the work when the said slide moves relative to the tool body; means for movably connecting the inner and outer slides comprising a structure having cam engagements with said slides; an abutment for said structure slidably supported by the tool body and movably engaging said structure; a spring tending to move the abutment in one direction; and a movable latch for holding the abutment against such movement, said latch being movable to its inoperable position by the relative movement of the tool body and the first mentioned slide and said movement throughout at least the major part of the thread-cutting operation being independent of the movement of the latch.

6. In a tool for forming taper threads, the combination of a tool body; means, comprising a cutter movably mounted on the body, for cutting a thread when the tool body and the work to be threaded are given relative rotational and axial movements; means movably supported on the tool body and operable by relative axial movement of the said body and the work gradually to retract the cutter relative to the work during at least a portion of the thread-cutting operation and rapidly to retract the cutter further at the end of the cutting operation, said means comprising parts having coacting cam surfaces which are maintained in mutual engagement over substantial areas throughout the gradual retraction of the cutter and which are adapted by their mutual relative movement to effect the said gradual retraction, an abutment for at least one of the cam parts movably mounted on the tool body and movably engaging said cam part, a spring tending to move the abutment in one direction on the tool body, a disengageable latch operatively interposed between the tool body and the abutment and adapted when engaged to prevent such movement of the abutment, and means for moving the latch only during a final minor portion of the thread-cutting movement of the tool to disengage the latch and, by the resulting rapid movement of the abutment and the cam part carried thereby, effect the aforesaid rapid retraction of the cutter; and means for restoring the said abutment to its latched position to permit the resetting of the cutter for the next thread-cutting operation.

7. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during at least a portion of the thread-cutting operation and rapidly to retract the cutter further at the end of the cutting operation, said means comprising parts having coacting cam surfaces which are maintained in mutual engagement over substantial areas throughout the retraction of the cutter and which are adapted by their mutual relative movement to effect the said gradual retraction, an abutment for at least one of the cam parts movably mounted on the tool body and movably engaging said cam part, a spring tending to move the abutment in one direction on the tool body, a disengageable latch operatively interposed between the tool body and the abutment and adapted when engaged to prevent such movement of the abutment, and means for moving the latch only during a final minor portion of the thread-cutting movement of the tool to disengage the latch and, by the resulting rapid movement of the abutment and the cam part carried thereby, effect the aforesaid rapid retraction of the cutter, the tool body and abutment being formed to cooperate as air cylinder and piston to check the rapid movement of the abutment.

8. In a tool for forming taper threads, the combination of a tool body; means, comprising a cutter movably mounted on the body, for cutting a thread when the tool body and the work to be threaded are given relative rotational and axial movements; means, comprising a slide mounted on the tool body, adapted by relative movement of said slide and body gradually to retract the cutter relative to the work during the thread-cutting operation; work-engaging means carried by the tool body and held against axial movement in relation to the work during the thread-cutting operation; operative connections between the last named means and the slide; a spring interposed between the work-engaging means and a part of the tool that is rigid with the tool body during the gradual retraction of the cutter, said spring serving to yieldingly oppose the relative movement of said means and body during the thread-cutting operation; and means carried by one of the two parts between which said spring is interposed and slidably engaging the other of said parts to cushion and positively limit the return movement to initial work-engaging position of the work-engaging means caused by said spring.

9. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against movement relative to the work during the thread-cutting operation; a cam connection between the other slide and the cutter to provide for movement of the cutter relative to the work when the said slide moves relative to the tool body; means for operatively connecting the inner and outer slides comprising a structure having cam connections with said slides; an abutment for said structure slidably mounted on the tool body and adapted by movement in one direction to retract the cutter in relation to the work; a latch for holding the abutment against such movement, said latch being disengageable by the relative movement between the tool body and the slide which is held against movement relative to the work; a spring interposed between the last named slide and the abutment, the said spring being adapted to effect the said movement of the abutment and to separate said slide and abutment; and means carried by one of the two parts between which the said spring is interposed and slidably engaging the other of said parts to cushion and positively limit such separation of the slide and abutment.

10. In a tool for forming taper threads, the combination of a chambered tool body; means, comprising a cutter movably mounted on the body, for cutting a thread when the tool body and the work to be threaded are given relative rotational and axial movements; a slide mounted for axial movement in the tool body and adapted to be held against axial movement relative to the work during the thread-cutting operation; a slide structure mounted for axial movement on the outside of the tool body and comprising front and rear sections and a threaded ring for connecting the two sections and adjusting them axially of the tool body in relation to each other; a cam connection between the front section of the outer slide and the cutter to provide for movement of the cutter relative to the tool body; and operative connections between the inner slide and the rear section of the outer slide.

11. In a threading tool, the combination of a tool body; means, comprising a cutter movably mounted on the body, for cutting a thread when the tool body and the work to be threaded are given relative rotational and axial movement; and means movably supported on the tool body and operable by relative axial movement of the said body and the work gradually to retract the cutter relative to the work during the thread-cutting operation, said means comprising a slide mounted on the tool body, a cam member rotatable mounted in said slide and a slidably mounted cam member formed with a plurality of separate cam surfaces with different slopes adapted alternatively to cooperate with a cam surface of the rotatably mounted cam member.

12. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the last named slide and the cutter to provide for movement of the cutter relative to the work when the said slide moves relative to the tool body; means operatively connecting the inner and outer slides comprising a cam structure having cam connections with said slides; an abutment for the cam structure slidably mounted on the tool body and movably engaging the cam structure; a spring tending to move the abutment in one direction to effect rapid retraction of the cutter; a latch for holding the abutment against such movement, said latch being disengageable by the relative movement of the tool body and the slide which is held against movement relative to the work; and means alternatively usable with a part of the cam connection between the cam structure and the slide having the cam connection with the cutter to prevent movement of the last named slide during the thread-cutting operation without preventing rapid movement of said slide when the abutment is moved by the spring to effect rapid retraction of the cutter at the end of the thread-cutting operation.

13. In a tool for forming taper threads, the combination of a tool body; means, comprising a cutter movably mounted on the body, for cutting a thread when the tool body and the work to be threaded are given relative rotational and axial movements; means movably supported on the tool body and operable by relative axial movement of the said body and the work gradually to retract the cutter relative to the work during at least a portion of the thread-cutting operation and rapidly to retract the cutter further at the end of the cutting operation, said means comprising parts having coacting cam surfaces maintained in mutual engagement throughout the gradual retraction of the cutter and adapted by their mutual relative movement to effect the said gradual retraction, an abutment for at least one of the cam parts movably mounted on the tool body, a spring tending to move the abutment in one direction on the tool body, a disengageable latch adapted when engaged to prevent such movement of the abutment, said latch being movable independently of the said cam parts, and means operable at the end of the thread-cutting movement of the tool to disengage the latch and, by the resulting rapid movement of the abutment and the cam part carried thereby, effect the aforesaid rapid retraction of the cutter; and means operable independently of the said cam parts for disengaging the said latch at will to effect collapse of the cutter.

14. In a tool for forming taper threads, the combination of a tool body; means, comprising a cutter movably mounted on the body, for cutting a thread when the tool body and the work to be threaded are given relative rotational and axial movements; means movably supported on the tool body and operable by relative axial movement of the said body and the work gradually to retract the cutter relative to the work during at least a portion of the thread-cutting operation and rapidly to retract the cutter further at the end of the cutting operation, said means comprising parts having coacting cam surfaces maintained in mutual engagement throughout the gradual retraction of the cutter and adapted by their mutual relative movement to effect the said gradual retraction, an abutment for at least one of the cam parts movably mounted on the tool body, a spring tending to move the abutment in one direction on the tool body, a disengageable latch operatively interposed between the tool body and the abutment and adapted when engaged to prevent such movement of the abutment, and means operable at the end of the thread-cutting movement of the tool to disengage the latch and, by the resulting rapid movement of the abutment and the cam part carried thereby, effect the aforesaid rapid retraction of the cutter; and manual means adapted when moved in one direction to disengage the said latch without movement of said cam parts to effect collapse of the cutter and when moved in another direction positively to restore the collapsed cutter to working position and simultaneously to restore the said abutment to latched position.

15. In a tool for forming threads, the combination of a chambered tool body; means, comprising a cutter movably mounted on the body, for cutting a thread when the tool body and the work to be threaded are given relative rotational and axial movements; slide structures mounted on the tool body, one inside thereof and the other outside thereof; means for transmitting movement of one slide to the other; a cam connection between one of the slides and the cutter; means, comprising a spring, for yieldingly pressing the other slide against the work, said spring being compressed by the movement of said slide during the thread-cutting operation; and means for positively holding the latter slide in its spring-compressed position.

16. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the inner and outer slides comprising a structure having a cam connection with at least one of the slides; an abutment for said structure and movably slidably mounted on the tool body and movably engaging said structure; a spring tending to move the abutment in one direction; a latch for holding the abutment against such movement; and operative connections between the latch and the slide which is held against axial movement relative to the work, said connections providing for lost motion between driving and driven parts whereby the slide is enabled to move independently of the latch during at least the major part of the thread-cutting operation.

17. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the slide last referred to and the cutter to provide for movement of the cutter relative to the work when the said slide moves relative to the tool body; means operatively connecting the inner and outer slides; an abutment with which the last named means is operatively connected, said abutment being slidably mounted on the tool body; spring means tending to move the abutment in one direction; a movable holding device adapted in one position to hold the abutment against such movement; and means operable by the relative movement of the tool body and the work to move the said holding device to inoperative position, said means in operation having lost motion between driving and driven parts thereof whereby the inner and outer slides of the tool are permitted to move independently of the said holding device during at least the major part of the thread-cutting operation.

18. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts adapted by their mutual relative movement to effect the said gradual retraction and insure a predetermined pitch diameter of the thread from point to point along its axis throughout at least the major portion of the thread cut, an abutment for at least one of said train of parts movably supported by the tool body, spring means for moving the abutment, and a movable holding device for the abutment operable by the said relative movement of the tool body and the work to effect the release of the abutment and the rapid retraction of the cutter at the end of the thread-cutting operation, the relative movement of the parts of said train throughout at least the major part of the thread-cutting operation being independent of the movement of the said holding device.

19. In a tool for forming taper threads, the combination of a tool body; means, comprising a cutter movably mounted on the body, for cutting a thread when the tool body and the work to be threaded are given relative rotational and axial movements; means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts adapted by their mutual relative movement to effect the said gradual retraction and insure a predetermined pitch diameter of the thread from point to point along its axis throughout at least the major portion of the thread cut, an abutment for at least one of said train of parts movably supported by the tool body, spring means for moving the abutment, and a movable holding device for the abutment operable by the said relative movement of the tool body and the work to effect the release of the abutment and the rapid retraction of the cutter at the end of the thread-cutting operation, the relative movement of the parts of said train throughout at least the major part of the thread-cutting operation being independent of the movement of the said holding device; and means operable at will at any stage of the thread-cutting operation to move the said holding device to inoperative position and effect collapse of the cutter.

20. In a tool for forming taper threads, the combination of a tool body; means, comprising a cutter movably mounted on the body, for cutting a thread when the tool body and the work to be threaded are given relative rotational and axial movements; means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts adapted by their mutual relative movement to effect the said gradual retraction and insure a predetermined pitch diameter of the thread from point to point along its axis throughout at least the major portion of the thread cut, an abutment for at least one of said train of parts movably supported by the tool body, spring means for moving the abutment, and a movable holding device for the abutment operable by the said relative movement of the tool body and the work to effect the rapid retraction of the cutter at the end of the thread-cutting operation, the relative movement of the parts of said train throughout at least the major part of the thread-cutting operation being independent of the movement of the said holding device; and manual means adapted to be moved in one direction at any stage of the thread-cutting operation to move the said holding means to inoperative position and effect collapse of the cutter and further adapted to be moved in another direction to restore the train of parts and the cutter to working position.

21. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the slide last referred to and the cutter to provide for movement of the cutter relative to the work when the said slide moves relative to the tool body; means for movably connecting the inner and outer slides comprising a structure having cam connections with said slides; an abutment for said structure slidably mounted on the tool body and movably engaging said structure; a movable holding device adapted in one position to hold the abutment from sliding in one direction and movable to an inoperative position by the relative movement between the tool body and the work; spring means interposed between the tool body and one of the slides adapted to hold the coacting surfaces of the cam connections between the said structure and the slides in mutual contact and to press the abutment against the holding device; and separate spring means interposed between the other slide and the abutment adapted to press the abutment against its holding means and, when the latter means is inoperative, to move the abutment and thereby effect retraction of the cutter, the last named spring means being progressively compressed and the first named spring means being progressively expanded during the thread-cutting operation.

22. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the slide last referred to and the cutter to provide for movement of the cutter relative to the work when the said slide moves relative to the tool body; means for movably connecting the inner and outer slides comprising a structure having cam connections with said slides; an abutment for said structure slidably mounted on the tool body and movably engaging said structure; a movable holding device adapted in one position to hold the abutment from sliding in one direction and movable to an inoperative position by the relative movement between the tool body and the work; spring means interposed between the tool body and one of the slides adapted to hold the coacting surfaces of the cam connections between the said structure and the slides in mutual contact and to press the abutment against the holding device; separate spring means interposed between the other slide and the abutment adapted to press the abutment against its holding means and, when the latter means is inoperative, to move the abutment and thereby effect retraction of the cutter, the last named spring means being progressively compressed and the first named spring means being progressively expanded during the thread-cutting operation; and means for positively limiting the expansion of the said separate spring means and the corresponding relative movement of the slide and abutment between which said spring means is interposed.

23. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof and one being adapted to be held against axial movement relative to the work during the thread-cutting operation and the other being adapted to have such movement; a cam connection between the slide last referred to and the cutter to provide for movement of the cutter relative to the work when the said slide moves relative to the tool body; means for movably connecting the inner and outer slides comprising a structure having cam connections with said slides; an abutment for said structure slidably mounted on the tool body and movably engaging said structure; a movable holding device adapted in one position to hold the abutment from sliding in one direction and movable to an inoperative position by the relative movement between the tool body and the work; spring means interposed between the tool body and one of the slides adapted to hold the coacting surfaces of the cam connections between the said structure and the slides in mutual contact and to press the abutment against the holding device; separate spring means interposed between the other slide and the abutment adapted to press the abutment against its holding means and, when the latter means is inoperative, to move the abutment and thereby effect retraction of the cutter, the last named spring means being progressively compressed and the first named spring means being progressively expanded during the thread-cutting operation; and means for resetting the tool following the thread-cutting operation, said means being adapted to compress the first named spring means by moving the slide associated therewith and thereby relieve pressure on the cam connections between the slides and so reduce resistance to mutual relative movement of the said cam connections by the other spring means.

24. In a tool for forming taper threads, the combination of a tool body; means, comprising a cutter movably mounted on the body, for cutting a thread when the tool body and the work to be threaded are given relative rotational and axial movements; and means operable by relative axial movement of the tool body and the work gradually to retract the cutter relative to the work during at least a portion of the thread-cutting operation and rapidly to retract the cutter further at the end of the cutting operation, said means comprising a train of parts which have coacting cam surfaces maintained in mutual engagement throughout the gradual and rapid retractions of the cutter and which serve by their combined mutual relative movements to effect the said gradual retraction and insure a predetermined pitch diameter of the thread from point to point along its axis throughout at least the major portion of the thread cut, means adapted at the end of the thread-cutting operation rapidly to move a portion of said train of parts operatively connected to the cutter without disengagement of any of the mutually engaging relatively sliding surfaces of said parts whose combined movements determine the pitch diameter of the thread as aforesaid, means for actuating the last named means, and means controlled by the relative axial movement of the tool body and the work operable automatically at the end of the thread-cutting operation to release the actuating means to effect the rapid retraction of the cutter.

25. In a tool for forming taper threads, the combination of a tool body; means, comprising a cutter movably mounted on the body, for cutting a thread when the tool body and the work to be threaded are given relative rotational and axial movements; and means operable by relative axial movement of the tool body and the work gradually to retract the cutter relative to the work during at least a portion of the thread-cutting operation and rapidly to retract the cutter further at the end of the cutting operation, said means comprising a train of parts which have coacting cam surfaces maintained in mutual engagement over substantial areas throughout the gradual retraction of the cutter and which serve by their combined mutual relative movements to effect the said gradual retraction and insure a predetermined pitch diameter of the thread from point to point along its axis throughout at least the major portion of the thread cut, means adapted at the end of the thread-cutting operation rapidly to move a portion of said train of parts operatively connected to the cutter without disengagement of any of the mutually engaging relatively sliding surfaces of said parts whose combined movements determine the pitch diameter of the thread as aforesaid, means for actuating the last named means, and means controlled by the relative axial movement of the tool body and the work operable automatically at the end of the thread-cutting operation to release the actuating means to effect the rapid retraction of the cutter.

26. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during at least a portion of the thread-cutting operation and rapidly to retract the cutter further at the end of the cutting operation, said means comprising a train of parts which have mutually engaging relatively sliding surfaces and are adapted by their mutual relative movement to effect the said gradual retraction and insure a predetermined pitch diameter of the thread from point to point along its axis throughout at least the major portion of the thread cut, an abutment for at least one of said train of parts movably supported by the tool body, spring means comprising a train of parts which have holding device for the abutment operable by the said relative movement of the tool body and the work to effect the release of the abutment and the rapid retraction of the cutter at the end of the thread-cutting operation, the relative movement of the parts of said train throughout at least the major part of the thread-cutting operation being independent of the movement of the said holding device and the mutual engagement of the surfaces of said parts being maintained over substantial areas throughout the thread-cutting operation.

WILLIAM L. BENNINGHOFF.

CERTIFICATE OF CORRECTION.

Patent No. 2,054,028. September 8, 1936

WILLIAM L. BENNINGHOFF.

It is hereby certified that error appears in the printed specification of the above numbered patent requiring correction as follows: Page 3, second column, line 7, for the word "side" read slide; page 6, first column, line 8, for "rearwost" read rearmost; page 9, first column, line 73, claim 5, for "inoperable" read inoperative; page 13, second column, line 54, claim 26, strike out "comprising a train of parts which have" and insert instead the words for moving the abutment, and a movable; and that the said Letters Patent should be read with these corrections therein that the same may conform to the record of the case in the Patent Office.

Signed and sealed this 29th day of September, A. D. 1936.

Henry Van Arsdale (Seal) Acting Commissioner of Patents.